Sept. 15, 1953     C. M. KEARNS, JR     2,652,123
BLADE RETENTION MEANS WITH INCREASED STIFFNESS
Filed Nov. 22, 1949
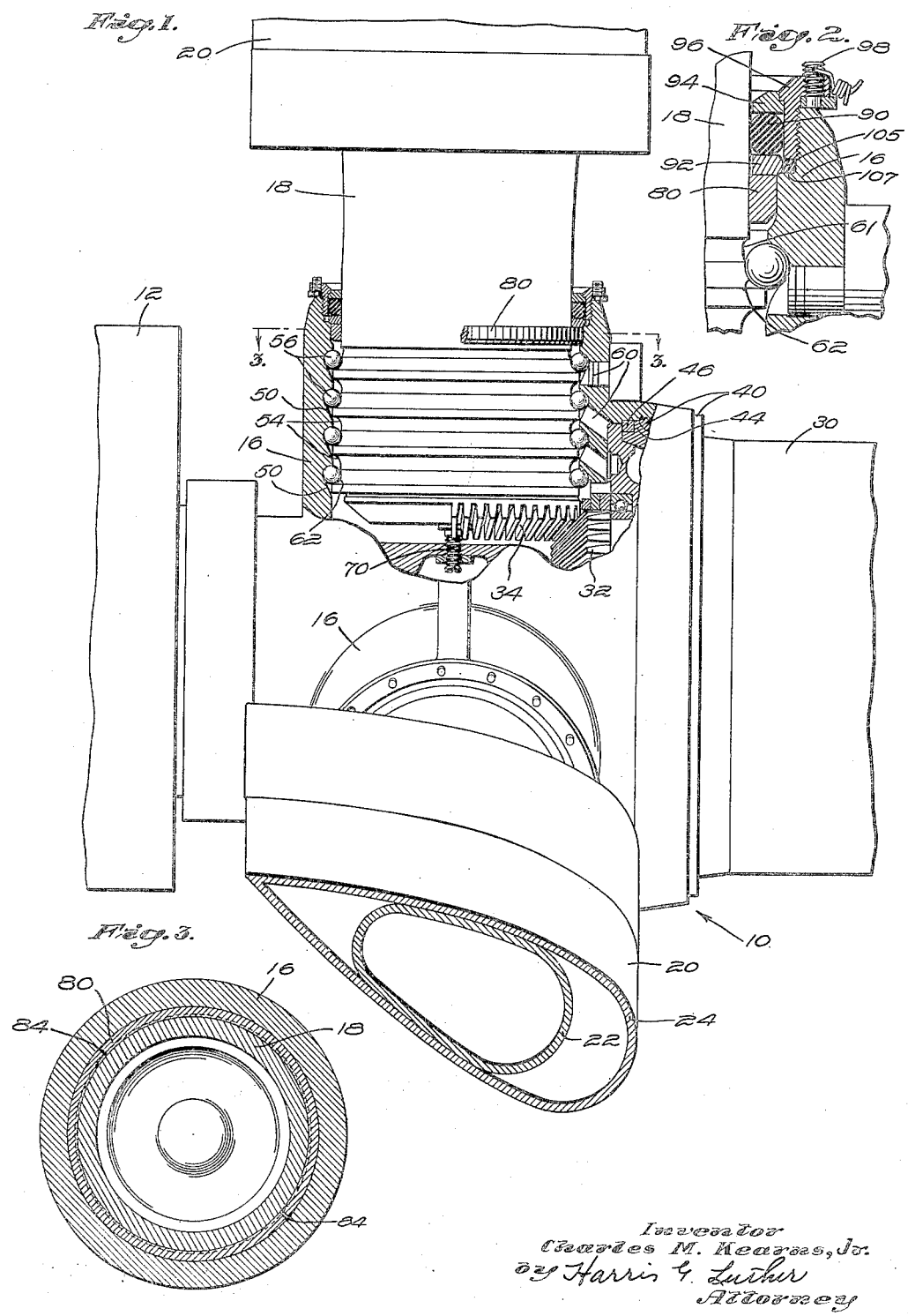

Patented Sept. 15, 1953

2,652,123

UNITED STATES PATENT OFFICE 2,652,123

BLADE RETENTION MEANS WITH INCREASED STIFFNESS

Charles M. Kearns, Jr., Wethersfield, Conn., assignor to United Aircraft Corporation, East Hartford, Conn., a corporation of Delaware Application November 22, 1949, Serial No. 128,860

5 Claims. (Cl. 170—160.58)

This invention relates to improvements in propeller blade retaining means and has particular reference to an improved means for increasing the stiffness of the retention mechanism of variable pitch blades and the load capacity of the retention bearing.

It is an object of this invention to provide an improved blade retaining means for controllable pitch propellers in which a plurality of rings of concentric anti-friction bearing elements are arranged between the blade shank and the blade receiving portion of the hub to restrain the blade against centrifugal and normal bending loads and includes a concentric ring which is positioned outboard of the anti-friction bearing elements for assisting the bearing in restraining the blades against bending loads higher than normal.

It is a further object of this invention to provide an improved blade retaining means of the type described wherein the concentric ring which restrains the blades against bending loads has at least one of its radial dimensions slightly different from its respective adjacent surface so that the bending restraint is effective only above a predetermined degree of bending flexure.

These and other objects of this invention will become readily apparent from the following detail description of the accompanying drawings in which, Fig. 1 is a side elevational view of a propeller hub in partial cross section illustrating the blade retention structure according to this invention.

Fig. 2 is a partial cross sectional view of the blade retention structure illustrating in detail the collar bearing of this invention.

Fig. 3 is a cross sectional view taken along the line 3—3 of Fig. 1.

Referring to Fig. 1, the numeral 10 generally indicates a propeller hub structure adapted to be mounted on the propeller drive shaft (not shown) adjacent the nose section 12 of an engine or power plant. The hub 10 is provided with a plurality of blade receiving sockets 16 each of which is adapted to receive the root or shank end 18 of a propeller blade 20 for pitch changing rotational movements of the blade about its longitudinal axis. The blade 20 may be a hollow metal blade having a core 22 and an outer integral shell 24, as shown, or it may be a solid blade if desired.

The hub 10 may carry a dome 30 for housing the blade pitch changing mechanism which in turn rotates the blade interconnecting gear 32 to vary the pitch of the propeller blades 20. Each of the blades 20 includes a gear segment 34 at the inboard end thereof which meshes with the gear 32 for this purpose. An annular retaining nut 40 surrounds the dome 30 and is threaded into the hub 10 so that it bears against a flange 44 on the inboard end of the dome 30 in order to lock the dome to the hub. A ring packing 46 may be positioned as shown in order to provide a fluid tight seal in the event that hydraulic fluid is utilized as the pitch changing medium for the propeller.

Each of the sockets 16 includes a plurality of internal annular grooves 50 and each of the blade shanks 18 includes a plurality of external annular grooves 54 which form outer and inner races respectively for a plurality of anti-friction ball bearings 56. When the blade 20 is in its innermost position with respect to the sockets 16 the ball bearings 56 may be inserted by means of a plurality of passages 60 which are provided in the sockets 16 of the hub and which passages are aligned with the smaller diameter loading races 61 on the blade shank 18.

A jackscrew mechanism 70 is provided which bears against the inboard end of the blade shank 18 to urge the blade outwardly along its longitudinal axis in order to pre-load the ball bearings 56 to any desirable degree to urge them into the larger diameter working races 62 on the blade shank.

The ball bearing retention mechanism including the jackscrew mechanism for preloading same is illustrated and described in more detail in copending patent application Serial No. 621,224, filed October 9, 1945, by John E. Anderson and Arthur N. Allen, Jr.

During operation, and especially where wide or paddle type blades are utilized, each of the blades 20 may be subject to high bending loads whereby the blade and the shank 18 will be caused to flex to the extent that brinelling or fatigue of the retention bearing may result. The bending loads may subject the shank and the entire blade to vibrations of resonant and other frequencies which can also affect the durability of the blades and propeller hub.

To this end a collar bearing 80 of suitable material is positioned outboard of the anti-friction bearings 56 between the blade shank 18 and the socket 16 for restraining the blade against bending movements transversely of its longitudinal axis. In this position the collar bearing 80 acts to restrain the blades against bending movements and vibrations adjacent the outer extremity of each of the sockets 16 to prevent the deleterious effects mentioned above.

As better seen in Figs. 2 and 3 the collar bearing 80 is firmly seated between the socket 16 and the blade shank 18 and may contain gaps 84 to permit positioning of the bearing around the blade. In its preferred form the collar bearing 80 has its annular thickness slightly less than the annular clearance between the blade shank 18 and the hub arm or socket 16. The blade is not subjected to high stresses during small bending movements which usually do not adversely affect the blade structure or its operation of the propeller. Thus, because of this annular clearance, it is only during relatively high amplitudes of vibration or bending that the blade is subjected to counteracting restraint.

As best seen in Fig. 2 a rubber or similar seal 90 may be sandwiched between a pair of spacers 92 and 94 in order to provide a fluid tight seal between the blade shank 18 and the outermost extremity of the socket 16. A retaining nut 96 including a lock screw 98 may be provided to maintain the spacer 94 in proper engaging position against the seal 90. A rubber or similar seal 105 is also provided between socket shoulder 107 and retaining nut 96 to prevent hydraulic fluid from leaking by the retaining nut threads.

As a result of this invention it is apparent that a simple yet highly efficient improved blade retention means has been provided whereby increased blade retention stiffening and increased bending load capacity of the retention bearing can be obtained during high bending loads while the blade is not subjected to penalizing friction during relatively low bending loads transversely of the blade longitudinal axis. In other words, increased blade retention stiffening and increased retention load capacity is provided only as an auxiliary in bending load ranges that may be harmful.

Although only one embodiment of this invention has been illustrated and described herein, it is obvious that various changes and modifications may be made in the arrangement and construction of the parts without materially departing from the scope of this novel concept.

What it is desired to secure by Letters Patent is:

1. In a blade mounting for a variable pitch propeller comprising a hub having a blade receiving socket, a plurality of anti-friction members between the blade and said socket for retaining the blade within said socket, means for stiffening said blade against deflections transversely of the axis of said socket including a bearing interposed between said blade and socket outboard of said members relative to the axis of rotation of the propeller, said bearing having its annular thickness less than the annular clearance between said blade and socket by a predetermined amount and normally out of contact with the blade whereby said deflections are restrained above a predetermined amplitude of deflection, and lock means outboard of said stiffening means for retaining the latter within said socket.

2. In a blade mounting for a variable pitch propeller comprising a hub having a blade receiving socket, a plurality of anti-friction members between the blade and said socket for retaining the blade within said socket, means for stiffening said blade against deflections transversely of the blade longitudinal axis comprising a friction bearing positioned between said socket and blade and located outboard of said anti-friction members relative to the axis of rotation of the propeller, said bearing having its dimension transversely of its axis different from that of its respective adjacent member by a predetermined amount and normally being out of contact with the blade whereby restraint of said transverse deflections is effective above a predetermined amplitude of deflection, and lock means outboard of said friction bearing for retaining the latter within said socket.

3. In a blade mounting for a variable pitch propeller comprising a hub having a blade receiving socket, a plurality of anti-friction members between the blade and said socket for retaining the blade within said socket, and means for stiffening said blade against deflections transversely of the blade longitudinal axis comprising an annular member closely fitting between said blade and socket and located outboard of said anti-friction members relative to the axis of propeller rotation, said annular member having its annular thickness smaller than the annular clearance between said blade and socket by a predetermined amount and normally being out of contact with the blade whereby restraint of said transverse deflections is effective above a predetermined amplitude of deflection, and lock means outboard of said annular member for restraining the latter against movement outboard along the blade axis.

4. In a blade mounting for a variable pitch propeller comprising a propeller shank subject under load to deflections transversely of the longitudinal axis thereof, a hub having a shank receiving socket, inner and outer anti-friction races between the blade and the hub, said inner races being integral with said shank and said outer races being integral with said hub, anti-friction elements positioned between said races, means for positioning said blade in said socket including mechanism for preloading said elements in the respective races, means for restraining the deflections of said shank comprising an annular ring between said shank and socket and positioned outboard of said races along the longitudinal axis of said shank, said ring having its transverse thickness less than the annular clearance between said shank and socket by a predetermined amount and normally being out of contact with the blade shank, and lock means outboard of said ring for retaining said ring within said socket.

5. In a blade mounting for a variable pitch propeller comprising a propeller shank subject underload to deflections transversely of the longitudinal axis thereof, a hub having a shank receiving socket, inner and outer anti-friction races between the blade and the hub, said inner races being integral with said shank and said outer races being integral with said hub, anti-friction elements positioned between said races for retaining said blade in said socket, means for positioning said blade in said socket including mechanism for preloading said elements in their respective races, means for restraining the deflections of said shank above a predetermined amplitude comprising an annular ring between said shank and socket and positioned outboard of said races relative to the axis of propeller rotation, said ring having at least one radial dimension smaller from that of its respective adjacent member by a predetermined amount and normally being out of contact with the blade whereby restraint of said deflections is effective only above a predetermined value of deflection and lock means outboard of said ring for restraining the latter against movement outboard along the blade axis.

CHARLES M. KEARNS, JR.

References Cited in the file of this patent

UNITED STATES PATENTS

| Number | Name | Date |
|---|---|---|
| 403,854 | Myers | May 21, 1889 |
| 1,801,511 | Lilley | Apr. 21, 1931 |
| 1,852,499 | Zipay | Apr. 5, 1932 |
| 2,113,438 | Allred | Apr. 5, 1938 |
| 2,313,301 | Ratie et al. | Mar. 9, 1943 |
| 2,344,266 | Reissner | Mar. 14, 1944 |
| 2,424,456 | Hallead | July 22, 1947 |

FOREIGN PATENTS

| Number | Country | Date |
|---|---|---|
| 462,479 | Great Britain | Mar. 10, 1937 |
| 506,374 | Great Britain | May 26, 1939 |
| 546,510 | Great Britain | July 16, 1942 |